US007720965B2

(12) United States Patent
Kaditz et al.

(10) Patent No.: US 7,720,965 B2

(45) Date of Patent: May 18, 2010

(54) CLIENT HEALTH VALIDATION USING HISTORICAL DATA

(75) Inventors: Jeffrey Kaditz, Redmond, WA (US); Bashar J Kachachi, Kirkland, WA (US); Joel M. Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 11/738,898

(22) Filed: Apr. 23, 2007

(65) Prior Publication Data

US 2008/0263677 A1 Oct. 23, 2008

(51) Int. Cl.
*G06F 15/173* (2006.01)

(52) U.S. Cl. ....................... 709/224; 709/223; 709/225; 370/252; 714/39; 713/183

(58) Field of Classification Search ................ 709/223, 709/224, 225; 370/252; 714/39; 713/183; 702/183, 186
See application file for complete search history.

(56) References Cited

U.S. PATENT DOCUMENTS

| | | | | |
|---|---|---|---|---|
| 4,672,572 | A * | 6/1987 | Alsberg | 726/11 |
| 6,105,027 | A * | 8/2000 | Schneider et al. | 707/9 |
| 6,192,477 | B1 * | 2/2001 | Corthell | 726/11 |
| 6,973,577 | B1 | 12/2005 | Kouznetsov | |
| 7,155,742 | B1 | 12/2006 | Szor | |
| 2003/0200464 | A1 * | 10/2003 | Kidron | 713/201 |
| 2005/0267954 | A1 | 12/2005 | Lewis et al. | |
| 2006/0070130 | A1 | 3/2006 | Costea et al. | |
| 2006/0085850 | A1 * | 4/2006 | Mayfield et al. | 726/14 |
| 2006/0265761 | A1 | 11/2006 | Rochette et al. | |
| 2007/0011744 | A1 | 1/2007 | Carothers et al. | |
| 2007/0016951 | A1 | 1/2007 | Piccard et al. | |

OTHER PUBLICATIONS

Apap, et al., "Detecting Malicious Software by Monitoring Anomalous Windows Registry Accesses", available at least as early as Feb. 27, 2007, at <<http://www.cs.columbia.edu/~sh553/papers/drafts/rad-dist02.pdf>>, pp. 1-13.

Christodorescu, et al., "Static Analysis of Executables to Detect Malicious Patterns", available at least as early as Feb. 27, 2007, at <<http://www.cs.virginia.edu/~soffa/cs851/cj03.pdf>>, pp. 1-18.

Ghosh, et al., "A Real-Time Intrusion Detection System Based on Learning Program Behavior", available at least as early as Feb. 27, 2007, <<http://thc.org.segfault.net/root/docs/intrusion_detection/hids/A-Real-Time-IDS-based-on-Learning.pdf>>, pp. 1-17.

Kirda, et al., "Behavior-based Spyware Detection", available at least as early as Feb. 27, 2007, at <<http://thor.auto.tuwien.ac.at/~chris/research/doc/usenix06_spyware.pdf>>, pp. 1-16.

* cited by examiner

*Primary Examiner*—Thu Ha T Nguyen
(74) *Attorney, Agent, or Firm*—Lee & Hayes, PLLC

(57) ABSTRACT

Implementations of client health validation using historical data are described. In one implementation, historical data on a client, such as a laptop, attempting to access a network is scanned. The historical data can come in many forms, including cookies and application data caches saved on the client. The historical data can be used to assess a health of the client. For example, if historical data stored in an application data cache indicates interactions between the client and a website known to disseminate malicious agents, the client can be assessed to have unacceptable health. Alternately, if the historical data indicates that the client has not interacted with enough suspicious sources to constitute a danger to the network, the client can be assessed to have acceptable health. In such a case, the client can be allowed to access the network.

20 Claims, 8 Drawing Sheets

600

602 Intercept An Attempt to Access a Network

604 Scan Historical Data on Client Attempting to Access Network

606 Assess Health of the Client Based on the Historical Data

608 Issue a Health Certificate to Client if the Health of the Client is Acceptable 610 Allow the Client to Access the Network if the Client has a Valid Health Certificate

800

802 Scan Device Infected with Malicious Agent

804 Use Scan Results to Investigate Ingress Patterns of Malicious Agent into Infected Device 806 Use Scan Results to Investigate Egress Patterns of Malicious Agent from Infected Device 808 Utilize Ingress and Egress Patterns of Malicious Agent to Discover Propagation Characteristics of Malicious Agent 810 Use Propagation Characteristics of Malicious Agent to Ameliorate Propagation of Malicious Agent

CLIENT HEALTH VALIDATION USING HISTORICAL DATA

BACKGROUND

As the number of mobile computing-based devices in an organization grows, the set of machines connected to the organization's network becomes more dynamic. This occurs as machines leave the organization's network, potentially join other untrusted networks and then return to the organization's network. For example, employees may take laptop computers home and view Internet sites or share files via various public and private networks.

Every time a machine migrates among networks outside the organization's network, the machine can be exposed to malicious agents, including malware such as viruses, worms, etc. These malicious agents can then be introduced to the organization's network when the infected machine is reconnected to the organization's network. In this way, potentially all of the resources connected to the organization's network can be exposed to a variety of malicious agents.

SUMMARY

Implementations of client health validation using historical data are described. In one implementation, historical data on a client, such as a laptop, attempting to access a network is scanned. The historical data can come in many forms, including cookies and application data caches saved on the client.

The historical data can be used to assess a health of the client. For example, if historical data stored in an application data cache indicates interactions between the client and a website known to disseminate malicious agents, the client can be assessed to have unacceptable health. Alternately, if the historical data indicates that the client has not interacted with enough suspicious sources to constitute a danger to the network, the client can be assessed to have acceptable health. In such a case, the client can be allowed to access the network.

This summary is provided to introduce a selection of concepts that are further described below in the detailed description. This summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for implementing client health validation using historical data. More particularly, the techniques described herein involve scanning historical data on a client attempting to gain access to a network for indicators associated with suspicious activity between the client and one or more suspicious sources. For example, application data caches on the client can be scanned for indications that the client has interacted with sources known or suspected to disseminate malicious agents. The scanned historical data can be evaluated to decide whether the client should be allowed to access the network, or whether the client should be subjected to remedial actions, such as a deep scan, malware remediation, or quarantining from the network.

Exemplary Environment

Figure 1:
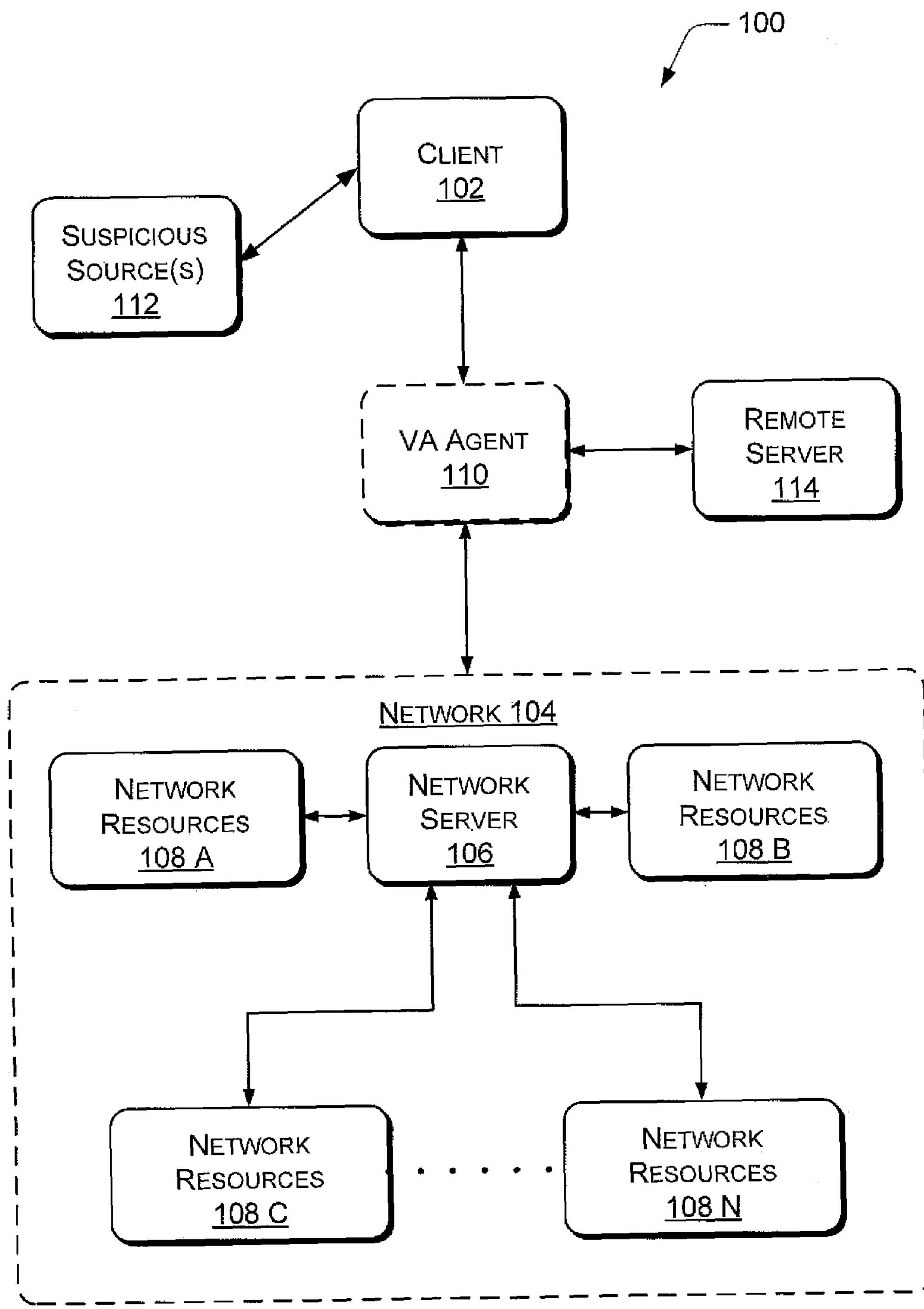
FIG. 1 illustrates an exemplary environment in which client health validation using historical data may be implemented.

FIG. 1 shows an exemplary environment 100 suitable for implementing client health validation using historical data. Environment 100 includes a client 102 configured to access a network 104. Client 102 can include a variety of computing-based devices including, for example, a server, a game console, a desktop PC, a notebook or portable computer, a workstation, a mainframe computer, an Internet appliance, a mobile phone, and so on.

Network 104 can include a variety of devices such as a network server 106 coupled to one or more network resources 108A-N. Network server 106 can include any computing-based device configured to facilitate communication between client 102 and network 104. For example, network server 106 can include a dedicated server, a desktop PC, a notebook or portable computer, a workstation, a mainframe computer, and so on. Similarly, network resources 108A-N can include any devices configured to be electrically coupled in a network, including computing-based devices, storage devices, etc.

Exemplary environment 100 also includes a vulnerability assessment (VA) agent 110 configured to scan client 102 and assess a health of client 102 before allowing client 102 to access network 104. For example, upon receiving a request from client 102 to access network 104, VA agent 110 can examine historical data on client 102 to determine if client 102 has interacted with any suspicious sources 112. The historical data can include any data or information regarding past or present interactions between client 102 and sources capable of disseminating malicious agents, including malware, spyware, and agents configured to adversely affect client 102, or any devices to which client 102 may be coupled. For example, historical data may include application data caches, removable media logs, firewall logs, and cookies on client 102. Moreover, historical data can include data regarding attempts to change settings or alter records associated with interactions on client 102. For instance, historical data can include data regarding attempts by a program or device to erase records reporting interactions between one or more sources and client 102.

VA agent 110 can reside wholly or partially on any of a variety of computer-readable media, such as random access memory (RAM), read only memory (ROM), optical storage discs (such as CDs and DVDs), floppy disks, optical devices, flash devices, etc. Further, VA agent 110 can reside on different computer-readable media at different times.

Additionally, VA agent 110 can be implemented through a variety of computing-based devices including, for example, a server, a desktop PC, a notebook or portable computer, a workstation, a mainframe computer, an Internet appliance, and so on.

Moreover, VA Agent 110 can reside, either wholly or in part, on a range of different devices. For example, portions of VA agent 110 can exist on client 102, network server 106, and one or more remote servers in any combination. Further, different portions of VA agent 110 can exist on different devices at different times. For instance, portions of VA agent 110 can exist on client 102, network server 106, and one or more remote servers at different times. The composition, location, and function of VA agent 110 will be discussed more fully below in conjunction with FIG. 3.

As noted above, VA agent 110 can examine historical data on client 102 to determine if client 102 has interacted with any suspicious sources 112. Suspicious sources 112 can include any sources, such as websites, file sharing sites, input/output devices (including USB keys, optical discs, and other computer readable storage media), known or suspected to disseminate malicious agents. For example, suspicious sources 112 can include websites known to disseminate malware, such as worms, viruses, etc. The term source, as used herein, can include websites, memory, or any other entities through which input/output interactions with the client can occur.

In operation, VA agent 110 can evaluate client 102 to have acceptable health if evidence in the historical data of client 102 indicates interactions between client 102 and suspicious sources 112 below a threshold at which the future health of client 102 and/or network 104 could be at risk. In one implementation, the threshold can be established in a risk policy set automatically, or through user intervention. For example, a conservative risk policy can include a tight threshold such that VA agent 110 can evaluate client 102 to have acceptable health only if the historical data on client 102 is devoid of evidence indicating interactions with known suspicious sources 112. Alternately, the risk policy can be less conservative, resulting in a looser threshold, allowing VA agent 110 to evaluate client 102 as having acceptable health if the historical data on client 102 indicates interactions with less than a given number of suspicious sources 112.

Moreover, since there may be differentiation among suspicious sources 112 (i.e., some suspicious sources may be deemed more dangerous than others), the risk policy can include a risk matrix. In one implementation, the risk matrix can include various combinations of suspicious sources 112, such as numbers and types of suspicious sources 112, that client 102 can interact with and still be below the threshold at which VA agent 110 can evaluate client 102 to have acceptable health.

Once VA agent 110 has evaluated client 102 to have acceptable health, VA agent 110 can allow client 102 to access network 104. In one implementation, VA agent 110 can issue client 102 a health certificate verifying the acceptable health of client 102. Client 102 can then present the health certificate to various devices with which client 102 wishes to communicate. For example, client 102 can present the health certificate to network server 106 in an attempt to access network 104. Additionally, client 102 can present the health certificate to peer devices, such as other computing-based devices in a peer-to-peer network, and the peer devices can base their decisions as to whether or not to communicate with client 102, on the health certificate.

Alternately, if evidence in the historical data of client 102 indicates interactions between client 102 and suspicious sources 112 above a threshold at which the future health of client 102 and/or network 104 could be at risk, VA agent 110 can evaluate client 102 to have unacceptable health. For example, if the historical data on client 102 includes data or information indicating interactions between client 102 and one or more suspicious sources 112 above a threshold set in the risk policy, VA agent 110 can evaluate client 102 to have unacceptable health.

Once VA agent evaluates client 102 to have unacceptable health, VA agent 110 can recommend and/or instigate remedial actions against client 102. For example, VA agent 110 can quarantine client 102, and prevent client 102 from accessing network 104. Additionally, VA agent 110 can further scan client 102 for malware and instigate a clean-up of client 102, removing all known malware on client 102. Moreover, VA agent 110 can tag client 102 as being untrustworthy, and refuse to issue a health certificate to client 102.

In one implementation, VA agent 110 can evaluate the historical data on client 102 through the use of a blacklist of known suspicious sources 112. The blacklist of known suspicious sources 112 can include a variety of information about suspicious sources 112, including the identities, locations, and levels of danger and/or risk associated with suspicious sources 112.

For example, a blacklist of known suspicious sources 112 can reside on VA agent 110 and be periodically updated with new suspicious sources 112 as identities of new suspicious sources 112 are found by various resources, such as anti-malware providers and other public and private entities inside and outside of network 104.

Alternately, the blacklist of known suspicious sources 112 residing on VA agent 110 can receive updates of suspicious sources 112 from a separate blacklist of sources residing on a remote server 114. Remote server 114, can include a desktop PC, a notebook or portable computer, a workstation, a mainframe computer, an Internet appliance, or any device capable of storing a blacklist of suspicious sources 112.

Further, in addition to having a blacklist of suspicious sources 112 residing on VA agent 110, in yet another possible implementation, a blacklist of suspicious sources 112 can be maintained on remote server 114. In such an implementation, VA agent 110 can access the blacklist and compare it with sources discovered while performing a scan of historical data on client 102.

It will be understood that the extent of network 104 can vary from the particular implementation shown in FIG. 1. For example, network 104 can include any combination of VA agent 110, remote server 114, network server 106, and network resources 108A-N.

Exemplary Client

Figure 2:
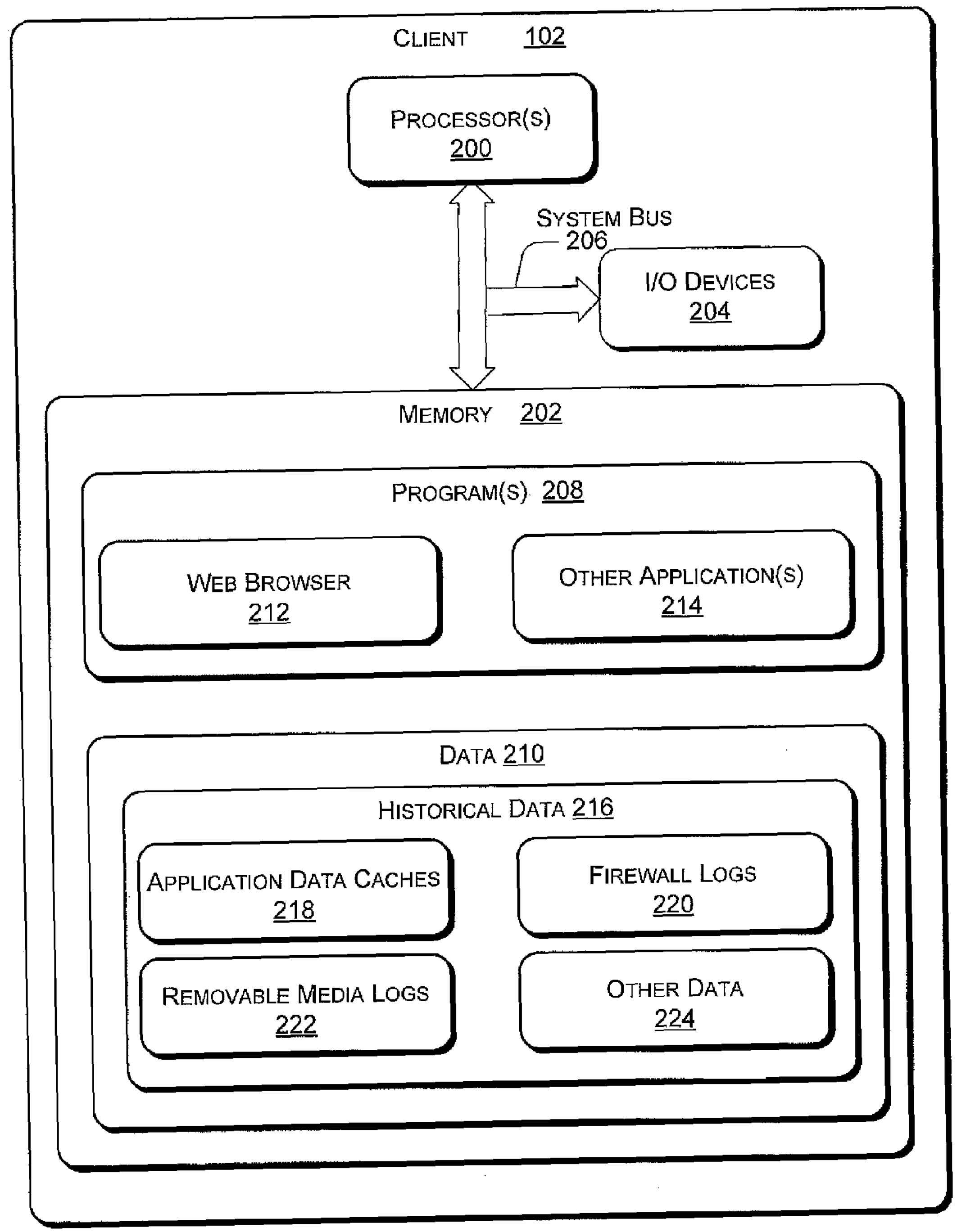
FIG. 2 illustrates an exemplary client.

FIG. 2 illustrates various components of client 102 according to one embodiment of client health validation using historical data. Client 102 can include one or more processor(s) 200, a memory 202, input/output (I/O) devices 204 (e.g., keyboard, display, and mouse), and a system bus 206 operatively coupling the various components of client 102.

System bus 206 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 202 can include computer-readable media in the form of volatile memory, such as RAM and/or non-volatile memory, such as ROM, or flash RAM. Memory 202 can also include data and program modules for implementing client health validation using historical data which are immediately accessible to, and presently operated on, by processor(s) 200.

Memory 202 can include programs 208 and data 210. Programs 208 can include a web browser 212 and other applications 214, including file sharing applications, word processing applications, spreadsheet applications, etc. In one possible implementation, other applications 214 can include all or portions of VA agent 110.

Data 210 can include historical data 216. As client 102 interacts with sources outside of client 102 (through, for example, programs 208), records associated with the interactions can be stored in historical data 216 within data 210. Historical data 216 can include any data or information indicative of interactions between client 102 and various sources with which client 102 can send, receive, or exchange data and/or instructions. For example, historical data 216 can include application data caches 218, firewall logs 220, removable logs 222, and other data 224, such as cookies, etc. Moreover, historical data 216 can include data regarding attempts to change settings or alter records associated with interactions on client 102. For instance, historical data 216 can include data regarding a program or device's attempts to erase records reporting the program or device's interactions with client 102.

In one implementation, when a user on client 102 browses the Internet using web browser 212, the identities of all the sites visited using web browser 212 may be saved in application data caches 218 and/or firewall logs 220 associated with web browser 212. Moreover, the various types of interactions between the sites and client 102, such as file sharing, downloading of information and so on, can be logged in removeable media logs 222 and/or in other data 224.

Similarly, if a user on client 102 engages in file sharing through use of a file sharing application in, for example, other applications 214, information regarding the file sharing interactions can be saved in an application data cache 218 associated with the file sharing application. Moreover, information regarding the interactions could be saved in firewall logs 220, and/or other data 224.

Exemplary Vulnerability Assessment Agent

Figure 3:
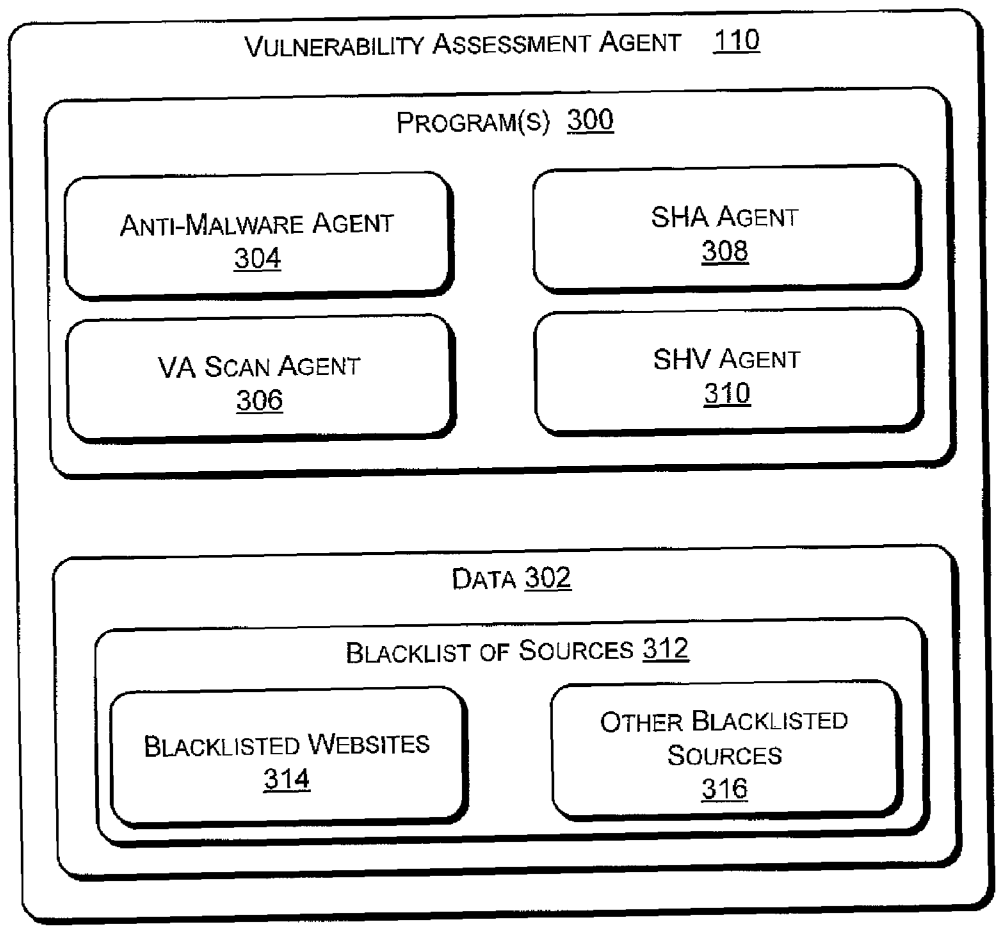
FIG. 3 illustrates an exemplary vulnerability assessment agent.

FIG. 3 illustrates various components of an exemplary VA agent 110 configured to evaluate the health of client 102 when client 102 attempts to gain access to a network, such as network 104. VA agent 110 can be implemented as a software module stored in whole or in part in a memory, such as memory 202. Alternately, VA agent 110 can reside in whole or in part in firmware.

VA agent 110 includes program(s) 300 and data 302. Program(s) 300 can include several modules, including an anti-malware agent 304, a vulnerability assessment (VA) scan agent 306, a system health assessment (SHA) agent 308, and a system health validator (SHV) agent 310. Similarly, data 302 can include a blacklist of sources 312, including blacklisted websites 314, and other blacklisted sources 316.

In one implementation, VA agent 110 can assess the health of client 102 before allowing client 102 to access network 104. For example VA agent 110 can be activated as client 102 attempts to log on to network 104 via network server 106. Alternately, VA agent 110 can be manually activated by, for example, a system administrator or a user once a presence of client 102 is detected.

To assess the health of client 102, VA scan agent 306 in VA agent 110 can scan historical data 216 on client 102 looking for indications that client 102 has been subjected to suspicious activities, such as interactions with one or more suspicious sources 112. In one implementation, VA scan agent 306 conducts a full scan of all data and information in historical data 216 in the course of evaluating the health of client 102.

In another possible implementation, VA scan agent 306 conducts a limited scan of historical data 216 based on scan cues received at VA agent 110 from various components which can instruct VA agent 110 to limit the scan based on certain suspicious activities. In one implementation, scan cues can automatically be sent to VA agent 110 by components such as anti-malware agent 304, and various security technologies or systems (including anti-virus applications) associated with client 102. Alternately, in another possible implementation, VA agent 110 can itself fetch scan cues from various components.

Scan cues can take many forms and include a variety of information regarding suspicious interactions. For example, scan cues can include information regarding interactions between client 102 and suspicious sources 112. Scan cues can also include information regarding interactions associated with client 102 that in themselves are suspicious—such as the alteration of entries or settings on client 102, communication of large files to or from client 102, and so on.

Scan cues can also recommend limiting a scan of client 102 to historical data 216 associated with certain applications involved in suspicious activities, and/or to interactions associated with client 102 occurring within certain time ranges. For example, VA agent 110 can receive scan cues from anti-malware agent 304, which can monitor client 102 and note suspicious activities occurring on client 102. The scan cues received from anti-malware agent 304 can include applications on client 102 which participated in the suspicious activities, as well as times at which the suspicious activities occurred. Using this information, VA scan agent 306 can scan historical data 216 for the intersection of interactions associated with the named applications which occurred on or after the times given by anti-malware agent 304.

In one implementation, an entity such as an administrator or a user may be given the option to conduct a full scan or a limited scan of historical data 216 based on scan cues. In another implementation, a limited scan of historical data 216 based on scan cues can be automatically conducted before a full scan of historical data 216 is conducted.

For example, if the limited scan of historical data 216 locates enough evidence of suspicious activities to justify evaluating the health of client 102 as unacceptable, client 102 can be quarantined from network 104. Once quarantined, client 102 can be tagged as having unacceptable health and/or remedial actions, including a deep scan of historical data 216 and cleaning of client 102 using anti malware software can be pursued.

Alternately, if the limited scan of historical data 216 does not locate enough evidence of suspicious activities to justify evaluating the health of client 102 as unacceptable, a full scan of historical data 216 can be conducted by VA scan agent 306, or the option to conduct a full scan of historical data 216 can be presented to an entity, such as an administrator or a user.

Both limited and full scans of client 102 can be further limited on the basis of new interactions. For example, VA agent 110 can store a time in which a last scan of client 102 was conducted in which VA agent 110 evaluated client 102 to have acceptable health. Given this information, VA scan agent 306 can perform a scan of historical data 216 for interactions occurring after the last scan of historical data 216. In this way VA scan agent 306 can limit the scan of historical data 216 to new entries occurring after the last scan of historical data 216 in which VA agent 110 evaluated client 102 to have acceptable health. Similarly, VA scan agent 306 can limit the scan of historical data 216 for entries and/or settings which have been modified since the last known scan of historical data 216 in which VA agent 110 evaluated client 102 to have acceptable health.

Further, temporally bounded scanning of historical data 216 can be granular with regard to locations in historical data 216. For example, if a limited scan of application data cache 218 for web browser 212 is desired, VA scan agent 306 can perform a scan of application data cache 218 for web browser 212 for interactions occurring after a last scan of application data cache 218 for web browser 212 was conducted by VA scan agent 306. Similarly, VA scan agent 306 can perform a scan of application data cache 218 for web browser 212 for interactions occurring within a given time range, before and/or after a given point in time.

VA scan agent 306 can compare the results of a full or limited scan of all or a part of historical data 216 against a blacklist of sources, such as blacklist of sources 312, to create a match assessment. The match assessment can include various data relating to interactions in searched portions of historical data 216 indicating known or possible interactions between client 102 and suspected sources 112.

For example, the match assessment can indicate the number of known or possible interactions between client 102 and suspected sources 112, the duration of the interactions, the frequency of the interactions, the use of computing resources (such as memory, processor resources, etc.) of client 102 associated with the interactions, and so on. Further, the match assessment can include identities of records or entries in historical data 216 associated with the known or possible interactions between client 102 and suspected sources 112. Additionally, the match assessment can include copies of the records or entries in historical data 216 associated with the known or possible interactions between client 102 and suspected sources 112.

VA scan agent 306 can forward the results of scans, both limited and full, of historical data 216—including the match assessment—to SHA agent 308. SHA agent 308 can utilize the results, along with information from other resources, to generate a preliminary client health assessment.

For example, SHA agent 308 can examine the results of scans and alter the preliminary client health assessment of client 102 based on factors such as the number, type, and duration of interactions between client 102 and suspicious sources 112. For instance, SHA agent 308 can lower the preliminary client health assessment of client 102 when the durations of interactions between client 102 and suspicious sources 112 are such that they increase the risk that client 102 may be infected by malicious agents. Similarly, SHA agent 308 can lower the preliminary client health assessment when the types of interactions between client 102 and suspicious sources 112 are such that they increase the risk that client 102 may be infected by malicious agents. For example, interactions such as file sharing interactions can be seen as being inherently risky and can be used by SHA agent 308 to lower the preliminary client health assessment.

In addition to altering the preliminary client health assessment of client 102 based on information associated with interactions, SHA agent 308 can also vary the preliminary client health assessment of client 102 based on an examination of the types of suspicious sources 112 with which client 102 has interacted. For example, interactions with more dangerous suspicious sources 112 can reduce the preliminary client heath assessment of client 102 more than interactions with less dangerous suspicious sources 112. For instance, SHA agent 308 can downgrade the client health assessment for client 102 when the results transmitted from VA scan agent 306 indicate interactions between client 102 and suspicious sources 112 known to disseminate malware.

Moreover, SHA agent 308 can examine information in the results transmitted from VA scan agent 306 for agreement with information from other resources. For example, a edge server with which client 102 has interacted, such as a gateway server, can be consulted. If agreement does not exist between the results transmitted from VA scan agent 306 and data on the edge server regarding the interactions between the client 102 and suspicious sources 112, SHA agent 308 may conclude that a malicious agent has attempted to erase evidence regarding its interactions with client 102. In such a case, SHA agent 308 can reduce the preliminary client health assessment of client 102.

SHA agent 308 can transmit its preliminary client health assessment of client 102 to SHV agent 310 where an evaluation can be made whether or not to grant client 102 access to network 104. In one exemplary implementation, if the preliminary client health assessment of client 102 includes no evidence of interactions with suspicious sources 112, SHV agent 310 can grant client 102 access to network 104. Similarly, if the preliminary client health assessment of client 102 includes evidence of interactions with suspicious sources 112, but the interactions and sources are such that the health of client 102 can be seen as acceptable (e.g., the scope of the interactions falls below a threshold in an existing policy), SHV agent 310 can grant client 102 access to network 104. In one implementation, SHV agent 310 can indicate that client 102 has acceptable health by issuing a health certificate to client 102.

In another possible implementation, SHV agent 310 can present its conclusions on the health of client 102 to a user or network administrator and prompt a response. For example SHV agent 308 can present its recommendation to a user or administrator to grant or deny client 102 access to network 104, and give the user or administrator the choice of either agreeing with the recommendation, or overriding the recommendation.

When a preliminary client health assessment of client 102 sent by SHA agent 308 includes evidence of interactions with suspicious sources 112 that place the health of client 102 at risk, SHV agent 310 can deem the health of client 102 to be unacceptable (e.g., the scope of the interactions lies above a threshold in an existing policy). In such case, SHV agent 310 can deny client 102 access to network 104. In one implementation, SHV agent 310 can accomplish this denial of access by refusing to issue a health certificate to client 102, or by issuing a health certificate to client 102 which states that the health of client 102 is unacceptable.

In the event that SHV agent 310 deems the health of client 102 to be unacceptable, one or more remedial actions involving client 102 can be undertaken. Remedial actions can include quarantining client 102 from network 104, marking client 102 as suspicious, performing a deep scan on client 102 to look for possible tampering or infection of client 102 with malicious agents, and processing client 102 to remove any malicious agents and/or any effects of malicious agents on client 102.

Exemplary Peer to Peer Environment

Figure 4:
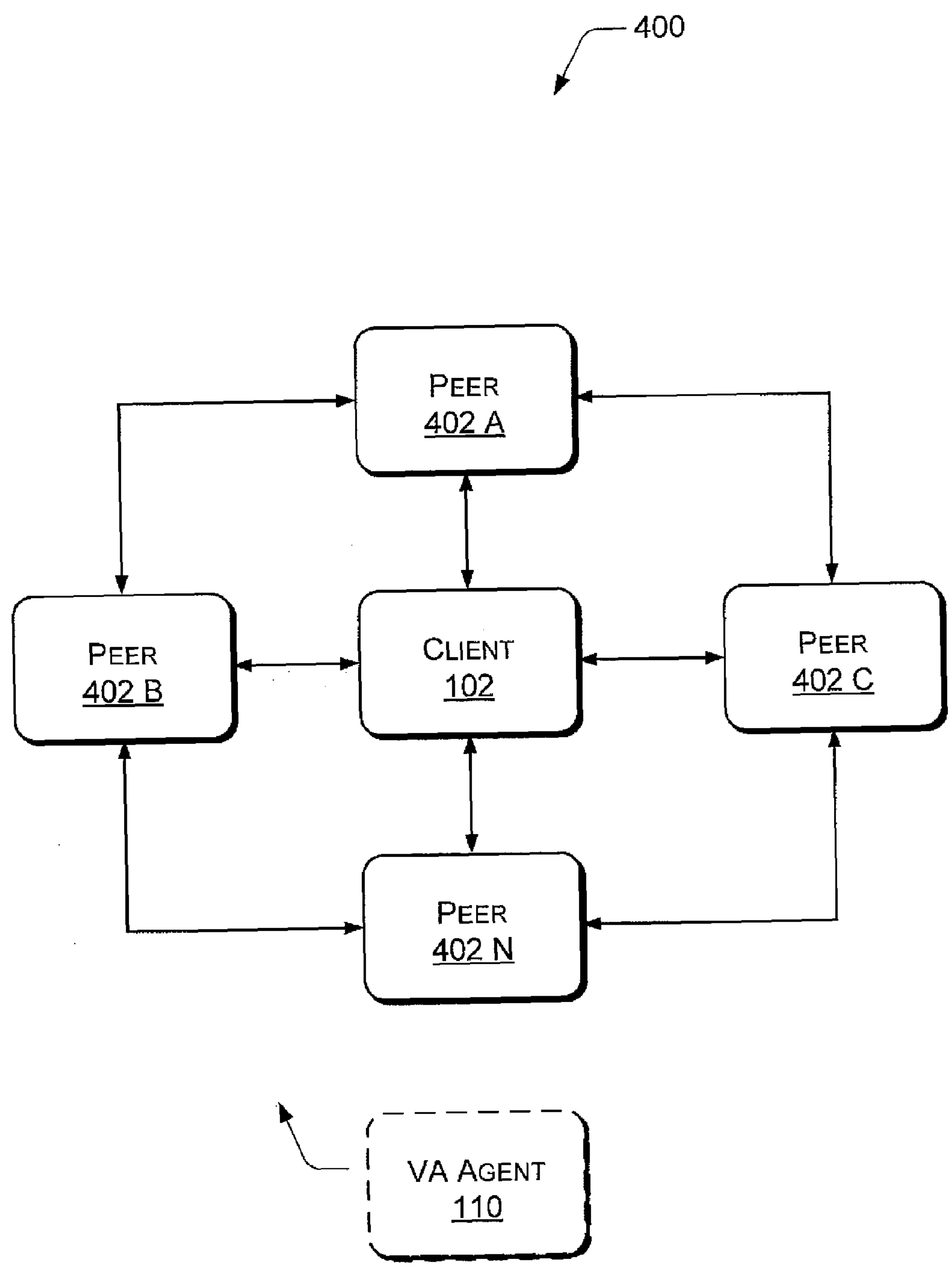
FIG. 4 illustrates an exemplary peer to peer environment in which a client can be evaluated through client health validation using historical data.

FIG. 4 shows an exemplary peer to peer environment 400 suitable for implementing client health validation using historical data. Environment 400 includes client 102 and one or more peer devices 402A-N with which client 102 can communicate. Peer devices 402A-N can include a variety of computing-based devices such as servers, desktop PCs, notebooks or portable computers, workstations, mainframe computers, Internet appliances, game consoles, mobile phones, and so on.

Peer to peer environment 400 also includes VA agent 110 configured to scan client 102 and assess a health of client 102 before allowing client 102 to communicate with the one or more peer devices 402A-N. For example, upon receiving a request from client 102 to communicate with one or more of the peer devices 402A-N, VA agent 110 can examine historical data 216 on client 102 to determine if client 102 has interacted with any suspicious sources 112. As discussed above, historical data 216 can include any data or information regarding past or present interactions between client 102 and sources capable of disseminating malicious agents, including malware, spyware, and agents configured to adversely affect client 102, or any devices to which client 102 may be coupled.

VA agent 110 may reside, either wholly or in part, on a variety of different devices in environment 400. For example, portions of VA agent 110 may reside on any combination of client 102 and peer devices 402A-N. Further different portions of VA agent 110 may exist at different times on client 102 and peer devices 402A-N. Alternately, VA agent 110 may exist entirely on any of client 102 and peer devices 402A-N.

Additionally, multiple instances of VA agent 110 may exist simultaneously in environment 400, and portions of the multiple instances of VA agent 110 may reside on any combination of client 102 and peer devices 402A-N.

For example, in one possible implementation, separate instances of VA agent 110 may exist for each of the peer devices 402A-N. In such an implementation, an instance of VA agent 110 can reside wholly or in part on either or both of client 102 and peer 402A. Similarly, a separate instance of VA agent 110 can reside wholly or in part on either or both of client 102 and peer 402B. Moreover, a separate instance of VA agent 110 can reside wholly or in part on either or both of client 102 and peer 402C, and so on.

In operation, when client 102 attempts to communicate with a particular peer device 402A-N, the instance of VA agent 110 associated with the particular peer device 402A-N can scan historical data 216 on client 102 and evaluate if client 102 has acceptable health before allowing client 102 to communicate with the particular peer device 402A-N.

For example, if client 102 attempts to communicate with peer device 402A, an instance of VA agent 110 associated with peer device 402A can scan historical data 216 on client 102 and evaluate if client 102 has acceptable health before allowing client 102 to communicate with peer device 402A. The instance of VA agent 110 associated with peer device 402A can utilize any of the techniques described above in conjunction with FIGS. 1-3 to evaluate the health of client 102. Similarly, the instance of VA agent 110 associated with peer device 402A can follow any of the courses of action described above in conjunction with FIGS. 1-3 once the health of client 102 has been evaluated (e.g. issue a health certificate, quarantine client 102, instigate remedial measures on client 102, and so on).

Similar processes can be followed when client 102 attempts to communicate with the remaining peer devices 402B-N in environment 400. Thus each peer device 402A-N can independently evaluate the health of client 102 using an associated instance of VA agent 110.

It will be understood that the various instances of VA agent 110 can employ different evaluation techniques. For example, an instance of VA agent 110 associated with peer device 402B may examine historical data 216 on client 102 in accordance with a different policy than that used by an instance of VA agent 110 associated with peer device 402C. Thus the health of client 102 may be evaluated differently by each peer device 402A-N. For instance some peer devices 402A-N may evaluate client 102 to have acceptable health, while other peer devices 402A-N may evaluate client 102 to have unacceptable health. In this way each peer device 402A-N may independently evaluate whether or not it will allow itself to communicate with client 102.

In another possible implementation, the various peer devices 402A-N can compare their independently derived health evaluations of client 102 and in accordance with a set policy, settle on a unified health evaluation for client 102. For example, in accordance with one policy, peer devices 402A-N can evaluate client 102 to have acceptable health if a majority or predetermined number or percentage of peer devices 402A-N independently evaluate client 102 to have acceptable health.

Alternately, in accordance with another set policy, peer devices 402A-N can evaluate client 102 to have unacceptable health if any of peer devices 402A-N independently evaluate client 102 to have unacceptable health.

In yet another possible implementation, one or more instances of VA agent 110 can evaluate the health of client 102, and client 102 can transmit the evaluation to one or more of peer devices 402A-N. For example, client 102 can be evaluated by VA agent 110 associated with peer device 402A. Client 102 can then transmit to other peer devices 402B-N in environment 400 how the health of client 102 has been evaluated by VA agent 110 associated with peer device 402A (i.e, acceptable or unacceptable). In one exemplary implementation, each of peer devices 402A-N can then independently decide whether or not to communicate with 102 based on the transmitted evaluation.

Correlation Across Multiple Devices

The techniques described in conjunction with FIGS. 1-4 can also be used to construct correlations across multiple devices in a network, such as across client 102 and network resources 108A-N in network 104, or across multiple peer devices in an environment, such as client 102 and peer devices 402A-N in environment 400. Correlations across multiple devices can be useful in many contexts, including the augmentation of blacklists of sources, such as blacklisted websites 314 and other blacklisted sources 316. Moreover, correlations across multiple devices can allow for the tracking of malicious agents spreading across a network.

For example, if several devices (such as client 102, network server 106, network resources 108A-N and peer devices 402A-N) exist on which malicious agents have been detected, historical data, such as historical data 216, on all of the devices can be scanned by one or more VA scan agents 306 to help identify how the devices became infected with the malicious agent. In one implementation, historical data on each of the infected devices can be scanned for interactions occurring since the last known scan of each device in which the device was evaluated as having acceptable health. Sources corresponding to interactions with each device occurring since the last scan of the device can then be isolated and compared. If a source appears across several devices, the source can be isolated as a suspicious source 112 in the infection of the devices and may possibly be added to a blacklist of sources 312.

In one implementation, frequency data can be kept on each source found during a scan of infected devices when the source appears across devices. If such a source reaches a configurable threshold defined as:

(number of times reported)/(total number of infections)

the source can automatically be added to blacklist of sources 312, thus enriching the knowledge of suspicious sources 112 which may disseminate malicious agents.

In addition to augmenting blacklists of sources, the techniques discussed above in conjunction with FIGS. 1-4 can also be used to track the spread of a malicious agent across a network, such as network 104, or an environment, such as peer to peer environment 400.

In one implementation, once a device (such as client 102, network server 106, network resources 108A-N, and peer devices 402A-N) infected with a malicious agent is detected in a network or environment, historical data, such as historical data 116, on the device can be examined to isolate from which source the malicious agent came, and determine to which devices the malicious agent may have been passed.

For example, scans of historical data on an infected device can be made to isolate all of the interactions occurring with the infected device since the last known scan of the device in which the device was evaluated to have acceptable health. These interactions can be examined for transactions in which data or commands were accepted or transmitted by the infected device. Sources associated with interactions in which the infected device accepted data and/or commands can then be checked to see if they were involved in disseminating the malicious agent to the infected device.

Similarly, sources associated with interactions in which the infected device transmitted data and/or commands can then be examined to track where the malicious agent might have been transmitted from the infected device. For example, each interaction after the last known clean scan of the infected device can be examined for interactions in which data and/or commands were transmitted to other devices. These other devices can then be scanned for the presence of the malicious agent.

If the malicious agent is found, the other devices may be similarly scanned to track where the malicious agent might have been further spread. Moreover the devices can be analyzed and details about the communication between the originally infected device and the subsequently infected devices can be analyzed to determine over which port(s) in the devices the communications were conducted. In this way the spread of the malicious agent can be tracked forward and backward from any infected device.

Moreover, the manner in which the malicious agent spreads can be extrapolated from the history of propagation of the malicious agent across all infected devices. This information can be used to estimate where the malicious agent will spread in the future, and what weaknesses exist in the network or environment which might be allowing the malicious agent to spread. In this way an administrator or other entity can contain the spread of the malicious agent, and cleanse the malicious agent from the network or environment Exemplary Algorithms In one embodiment, aspects of client health validation using historical data can be implemented using the following algorithms.

I. Algorithm for auto-discovery of malware infection sources: specific infection signatures:

1. On client (0) Malware scan completes:
    a. if no infection found, timestamp A is recorded as "Clean".
    b. if an infection event is found, for example event "infection μ found", timestamp $B_\mu$ is recorded.
2. A set $\alpha_{\mu(0)}$ is the set of application cache data entries that has been created or changed in the last ($B_\mu$−A) seconds on client (0), since the client (0) was infected by μ. $\alpha_{\mu(0)}$ is constructed by client (0).
3. $\alpha_{\mu(0)}$ is uploaded to a server which takes $\alpha_{\mu(0)} \cap \beta_\mu$, where $\beta=\alpha_{\mu(0)} \cup \alpha_{\mu(1)} \cup \alpha_{\mu(2)} \ldots \cup \alpha_{\mu(n)}$ (i.e., the union of all previously submitted $\alpha_\mu$'s from all clients, such as application cache data for machines reporting an infection of type μ).
4. A set $\alpha_{\mu(0)} \cap \beta$ is computed. This set represents possible sources of the infection μ.

II. Algorithm for auto-discovery of malware infection sources: Extension A—validation of cached data to aid in verification of system health:

5. The server can check with an edge firewall to make sure client (0) has reported all the external sites that client (0) has visited in the last (B−A) seconds. Any missing entries suggest client (0) has been compromised and cannot be trusted. Furthermore, missing entries are automatically labeled suspicious because client (0) has filtered them out for an unknown reason.

III. Algorithm for auto-discovery of malware infection sources: extension B—correlation of infection sources across different infection signatures:

6. The server computes $\alpha_{\mu(0)} \cap (\beta_\mu \cup \beta_\square \cup \beta_\pi \ldots)$. This computation yields a set of sites that could possibly be responsible for multiple types of infections μ, □, π . . .

IV. Algorithm for auto-discovery of infected sources: extension C—auto-triggering scans on exposed hosts or possible infection sources:

7. If there are any sites in $\alpha_{\mu(0)}$ that are managed by the system, a scan can be triggered on these systems. If the scan results in an infection detection event go to 1.
8. If there are any sites in $\alpha_{\mu(0)} \cap \beta$ or $\alpha_{\mu(0)} \cap (\beta_\mu \cup \beta_\square \cup \beta_\pi \ldots)$ that are managed by the system, they represent possible sources of infection and a scan can automatically be triggered. If the scan results in an infection detection event, jump to 1.

V. Algorithm for auto-discovery of malware propagation techniques:

1. Compute possible infection sources for a client (0) that is infected, for example, $\alpha_{\mu(0)}$.
2. Collect the firewall logs from client (0) and all managed machines in the set $\alpha_{\mu(0)}$.
3. Collect all ports and protocols used between all connections between client (0) and managed machines in $\alpha_{\mu(0)}$
4. For each type of infection keep a frequency graph for the number of times a machine has been listed as a possible infection source, and the types of communication that have taken place between the infected machine and the possible sources of infection.
5. As the number of infections increases, the system can predict with greater accuracy the source of the infections and the way the infections propagate across devices.

EXEMPLARY METHODS

FIGS. 5-8 illustrate exemplary methods for implementing aspects of client health validation using historical data. The methods are illustrated as a collection of blocks in a logical flow graph representing a sequence of operations that can be implemented in hardware, software, firmware or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may described with reference to elements shown in FIGS. 1-4.

Exemplary Method I

Figure 5:
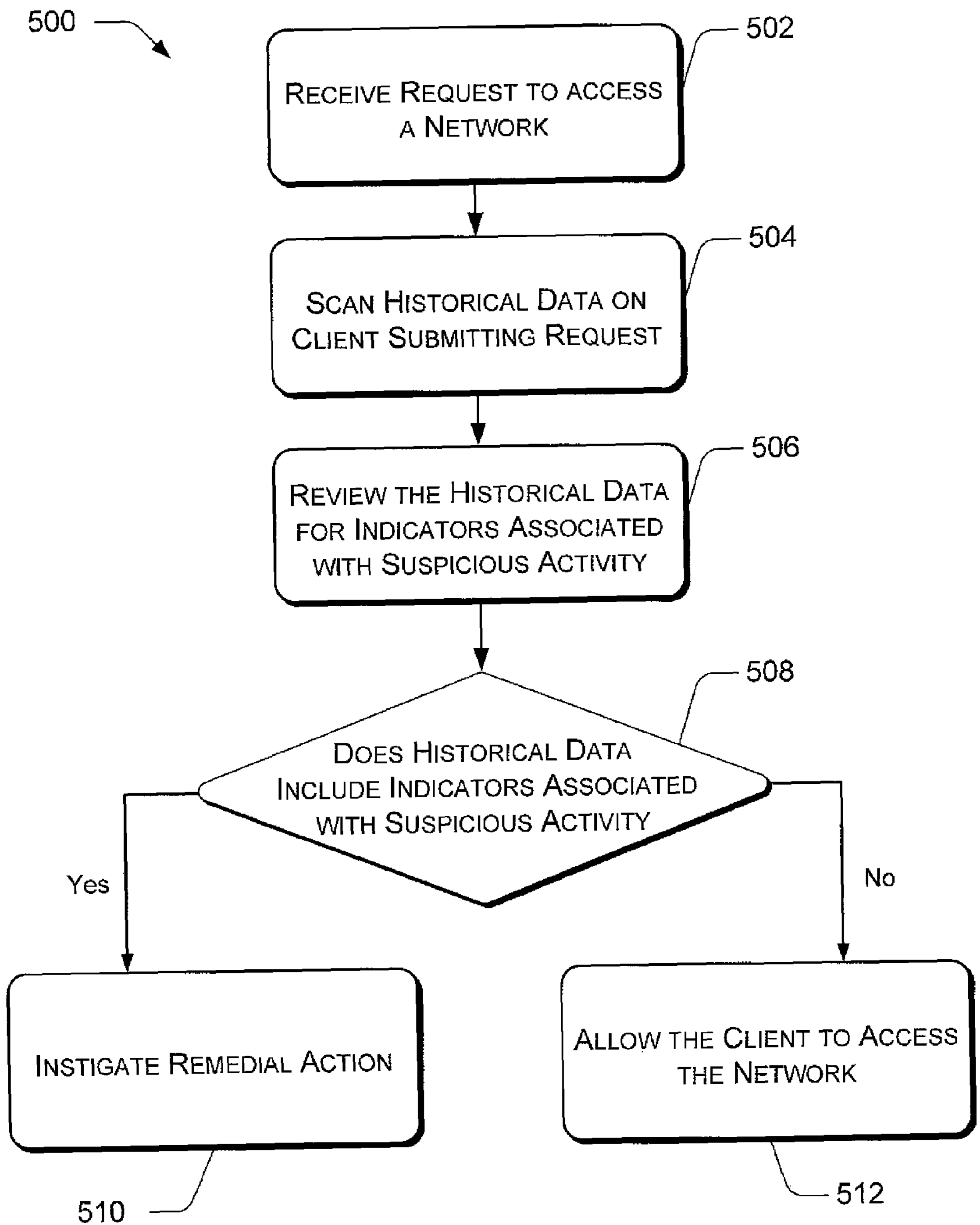
FIG. 5 illustrates an exemplary process for client health validation using historical data.

FIG. 5 illustrates an exemplary method 500 for implementing client health validation using historical data. At block 502, a client, such as client 102, attempts to access a network, such as network 104 or environment 400. The client's attempt to access the network is received by an agent, such as VA agent 110, configured to assess a risk associated with allowing the client to access the network. For example, the agent can evaluate the client to see if the client represents a danger of spreading malicious agents among devices, such as network resources 108A-N and peer devices 402A-N, in the network.

At block 504 the agent scans historical data, such as historical data 216, on the client and look for indications of suspicious activity. For example, the agent can examine the client to see if the client has experienced one or more suspicious interactions, including interactions with one or more suspicious sources, such as suspicious sources 112. In one implementation, the agent can conduct a full scan of all data and information in the historical data on the client. Alternately, the agent can conduct a limited scan of the historical data on the client. Such a limited scan can be based on scan cues received by the agent from various entities, including an anti-malware agent, such as anti-malware agent 304, or a protection technology or system, such as an anti virus application.

In one implementation, an entity such as an administrator or a user may be given the option to conduct a full scan or a limited scan of historical data based on the scan cues. In another implementation, a limited scan of the historical data based on scan cues can be automatically conducted before any full scan of historical data is conducted.

At block 506, the results of the scan is reviewed for indicators associated with suspicious activity. For example, results of a full or limited scan of all or a part of the historical data of the client can be examined and a list of sources with which the client has interacted can be generated. The sources on the list can be compared against a blacklist of sources, such as blacklist of sources 312. Matches between sources on the list and sources on the blacklist can indicate that the client has engaged in suspicious activity.

Similarly, other data from the scan can indicate that the client has engaged in suspicious activity. For example, the agent can examine the scan results for various factors, including numbers of interactions with suspected sources, duration of interactions with suspected sources, and types of interactions with suspicious sources. In one implementation, the agent can evaluate the client to have engaged in suspicious activity if a number of interactions with suspected sources, or a duration of interactions with suspected sources exceeds a preset limit in a policy. Similarly, the agent can evaluate the client to have engaged in suspicious activity if the types of interactions are such that they increase the risk that client may be infected by malicious agents, such as file sharing interactions.

Further, the agent can evaluate the client to have engaged in suspicious activity based on an examination of the types of suspicious sources with which the client has interacted. For instance, the agent can evaluate the client to have engaged in suspicious activity when the scan results indicate interactions between the client and suspicious sources known to disseminate malware.

Moreover, the agent can examine information in the scan results for agreement with information from other resources. For example, an edge server with which the client has interacted, such as a gateway server, can be consulted. If agreement does not exist between the scan results and data on the edge server regarding the interactions between the client and sources, the agent may conclude that a malicious agent has attempted to erase evidence regarding its interactions with the client. In such a case, the agent can evaluate the client to have engaged in suspicious activity.

If the agent evaluates the client to have engaged in suspicious activity (i.e., 'yes' path from block 508) the agent can instigate one or more remedial actions. For example, the client can be quarantined, and denied access to the network. Additionally, the client can be marked as suspicious. Similarly, a deep scan can be performed on the client to look for possible tampering or infection of the client with malicious agents. Further, the client can be processed to remove any malicious agents and/or any effects of malicious agents on the client.

Alternately, if at block 508 the agent evaluates the client to have not engaged in suspicious activity (i.e., 'no' path from block 508) the agent can allow the client to access the network (block 512).

Exemplary Method II

Figure 6:
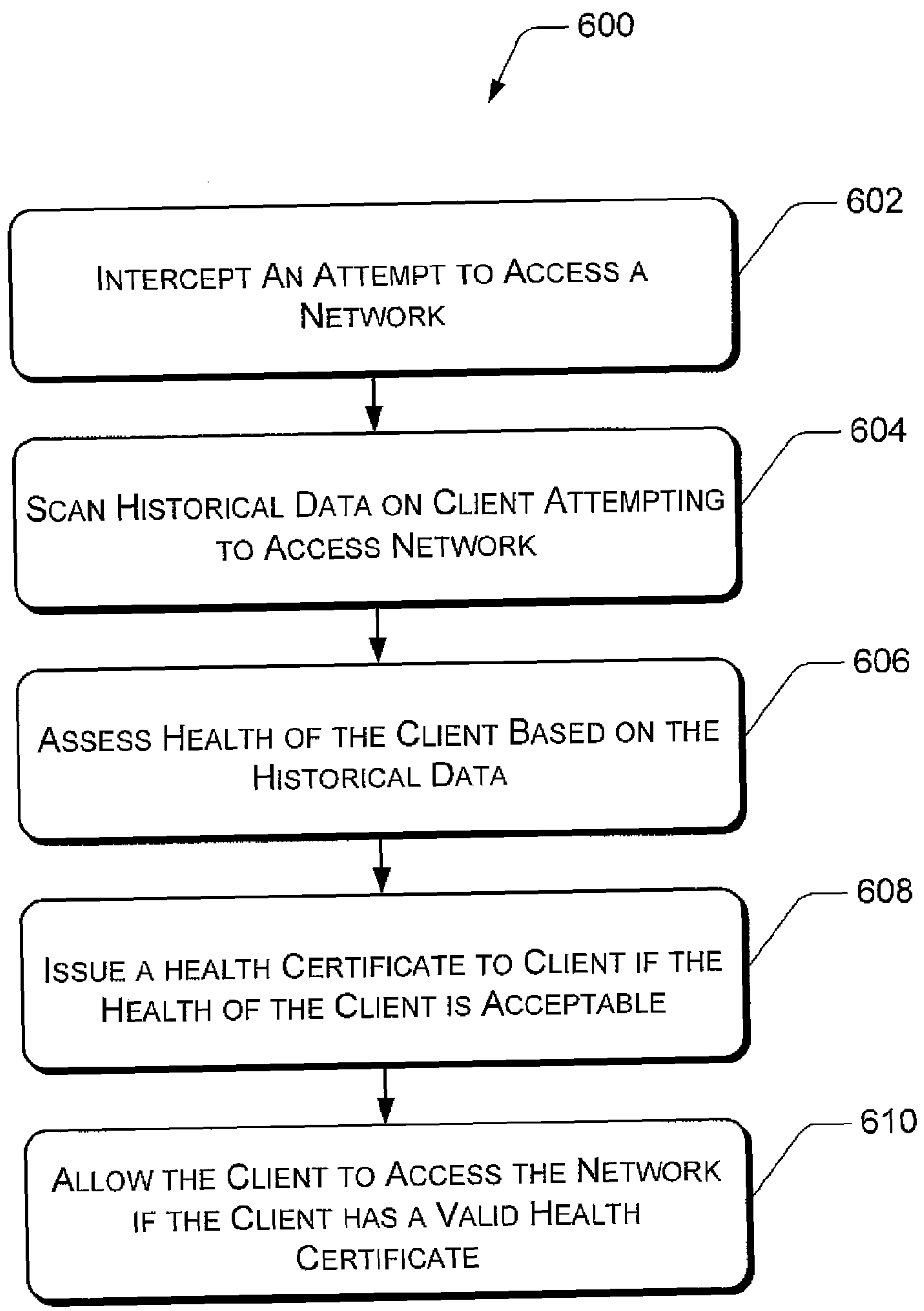
FIG. 6 illustrates and exemplary process for issuing a health certificate to a client evaluated as having acceptable health.

FIG. 6 illustrates an exemplary process 600 for issuing a health certificate to a client after a scan of the client indicates that the client has acceptable health in accordance with one implementation of client health validation using historical data.

At block 602 an attempt by a client, such as client 102, to access a network, such as network 104 or environment 400 is intercepted by an agent, such as VA agent 110.

At block 604, the agent scans historical data, such as historical data 216, on the client. The historical data can include any data or information regarding past or present interactions between the client and sources capable of disseminating malicious agents, including malware, spyware, and agents configured to adversely affect the client or any devices to which the client may be coupled. For example, historical data can include application data caches, removable media logs, firewall logs, and cookies. Moreover, historical data can include data regarding attempts to change settings or alter records associated with interactions on the client. For instance, historical data can include data regarding a program or device's attempts to erase records reporting the program or device's interactions with the client.

At block 606, the health of the client is assessed based on the results of the scan. For example, the agent can evaluate the client to have acceptable health if the agent finds no evidence in the historical data on the client indicating interactions between the client and any known suspicious sources, such as suspicious sources 112. Similarly, the agent can evaluate the client to have acceptable health if evidence in the historical data of the client indicates interactions between the client and suspicious sources below a threshold at which the future health of the client and/or the network could be at risk. For example, a risk policy can be set automatically, or through user intervention, allowing the agent to evaluate the client to have acceptable health if the historical data on the client indicates interactions with less than a given number of suspicious sources. Moreover, since there may be differentiation among suspicious sources (i.e. some suspicious sources may be deemed more dangerous than others), the risk policy may include a risk matrix including varying numbers and types of suspicious sources that can be interacted with and still be below a threshold at which the agent can evaluate the client to have acceptable health.

At block 608, a health certificate can be issued to the client if the client has been assed to have acceptable health. For example, the agent can issue the client a health certificate verifying the good health of client.

At block 610, the client can present the health certificate to the network with which it wishes to communicate in order to gain access to the network. For example, the client can present the health certificate to a network server, such as network server 106, and upon verification of the health certificate, the network server can allow the client to access the network. In another possible implementation, the client can present the health certificate to a device in a peer network, such as a peer device 402A-N, with which the client wishes to communicate. The device may allow communication with the client if the health certificate is verified.

Exemplary Method III

Figure 7:
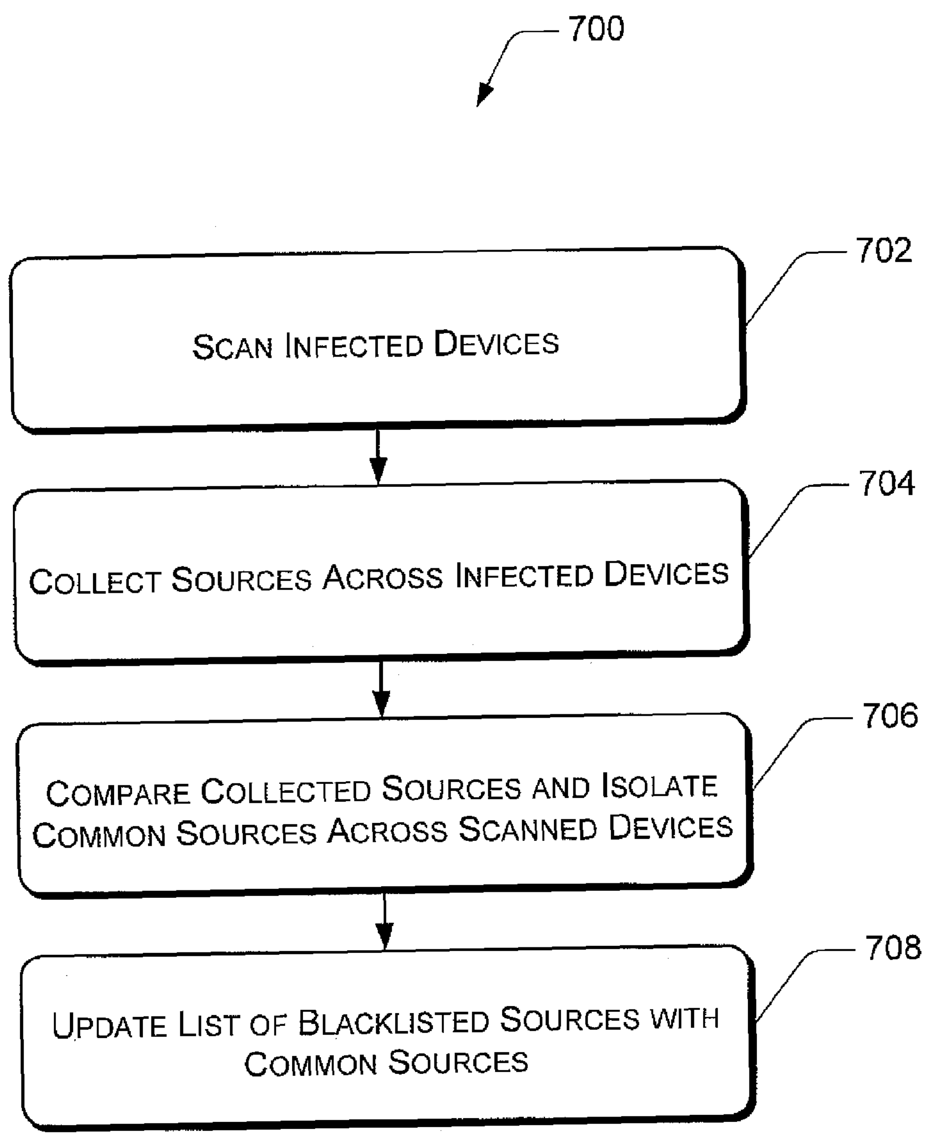
FIG. 7 illustrates an exemplary process for updating blacklists of sources through construction of correlations across multiple devices in a network.

FIG. 7 illustrates an exemplary process 700 for updating blacklists of sources through constructing correlations across multiple devices in a network in accordance with one implementation of client health validation using historical data.

At block 702, several devices in a network, such as client 102, network server 106, network resources 108A-N and peer devices 402A-N, are scanned for the existence of exist malicious agents. In one implementation, historical data, such as historical data 216, on all of the devices can be scanned by one or more VA scan agents, such as VA scan agent 306, to help identify how the devices became infected with the malicious agent. In one implementation, historical data on each of the infected devices can be scanned for interactions occurring since the last known scan of each device in which the device was evaluated as having acceptable health.

At block 704 sources corresponding to suspicious activities associated with each infected device are collected. For example, sources associated with suspicious interactions occurring since the last scan of each infected device are isolated.

At block 706, the collected sources for all of the infected devices corresponding to suspicious interactions are compared to one another. Each collected source common to suspicious interactions associated with two or more devices can be isolated as a common source. Common sources carry with them a presumption of danger as sources which may be involved in the dissemination of malicious agents.

In one implementation, frequency data can be kept on each source found during a scan of infected devices when the source appears across multiple infected devices. If such a source reaches a configurable threshold defined as:

(number of times reported)/(total number of infections)

the source can be isolated as a source which may be involved in the dissemination of malicious agents. Generally, the danger of dissemination of malicious agents associated with a common source increases as the frequency of occurrence of the common source across the various infected devices increases.

At block 708, the common sources can be used to augment existing blacklists of sources, such as blacklist of sources 312, thus enriching the knowledge of suspicious sources which may disseminate malicious agents.

Exemplary Method IV

Figure 8:
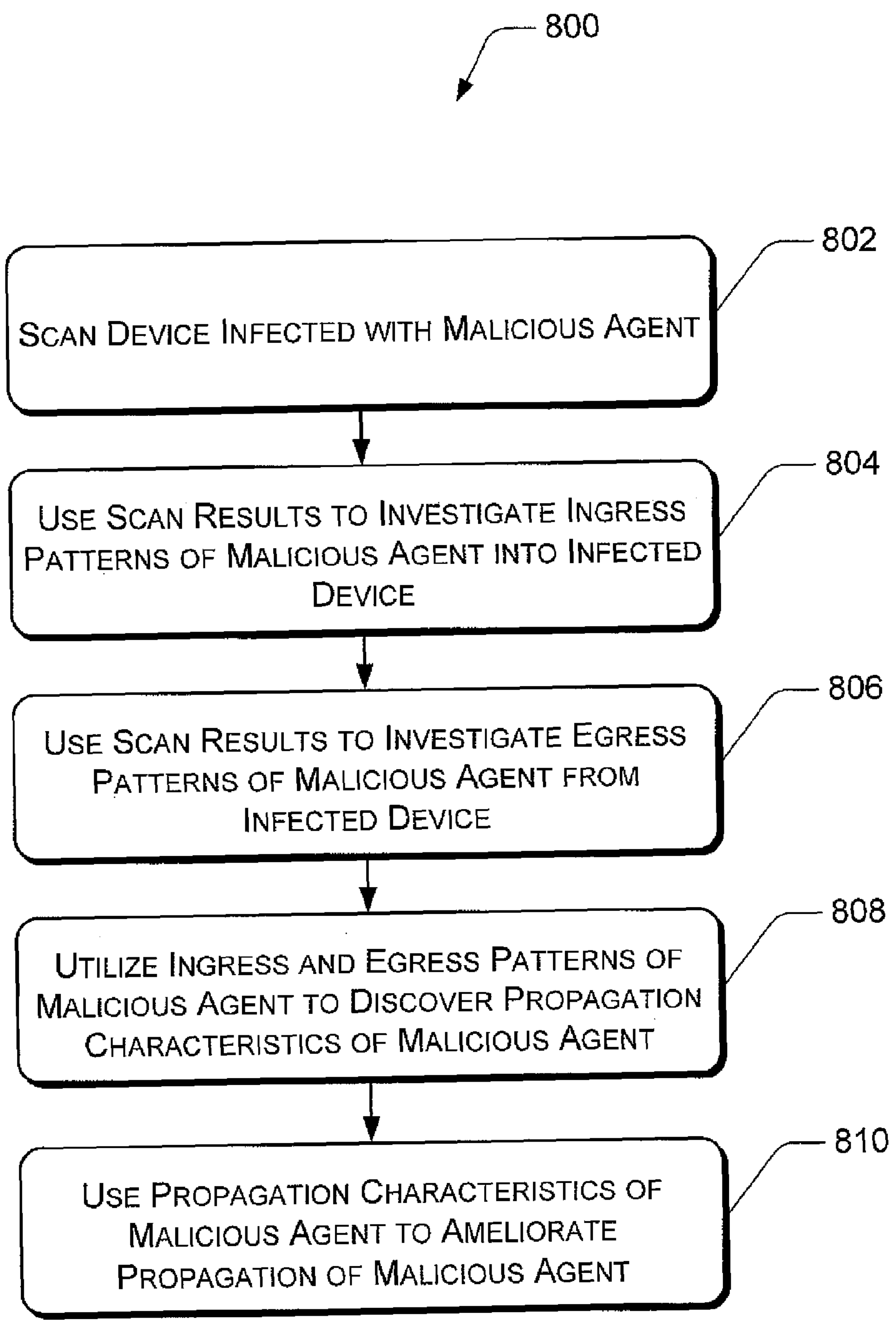
FIG. 8 illustrates an exemplary process for developing propagation characteristics of a malicious agent through construction of correlations across multiple devices in a network.

FIG. 8 illustrates an exemplary process 800 for developing propagation characteristics of a malicious agent through construction of correlations across multiple devices in a network in accordance with one implementation of client health validation using historical data.

At block 802, a device, such as client 102, network server 106, network resources 108A-N, and peer devices 402A-N, infected with a malicious agent is scanned. For example, historical data, such as historical data 116, on the device can be examined to isolate all interactions occurring with the infected device since the last known scan of the device in which the device was evaluated to have acceptable health. These interactions can be examined for transactions in which data or commands were accepted or transmitted by the infected device.

At block 804, the scan results can be used to investigate the ingress patterns of the malicious agent onto the device. For example, the interactions occurring with the infected device since the last known scan of the device in which the device was evaluated to have acceptable health can be examined for transactions in which data or commands were accepted by the infected device. Sources associated with interactions in which the infected device accepted data and/or commands can then be checked to see if they were involved in disseminating the malicious agent to the infected device.

Once a possible source of the malicious agent is isolated, interactions between the source and the infected device can be examined to determine how the malicious agent was able to achieve ingress into the infected device. For example, ports used by the malicious agent to achieve ingress as well as other details of the ingress of the malicious agent into the infected device can be examined.

At block 806 the results of the scan of the infected device can be used to investigate the egress of the malicious agent from the infected device to other devices. For example, sources associated with interactions in which the infected device transmitted data and/or commands can be examined to track where the malicious agent might have been transmitted from the infected device. In one implementation, all of the interactions associated with the infected device after the last known clean scan of the infected device can be examined for interactions in which data and/or commands were transmitted to other devices.

Once a destination device of the malicious agent is isolated, interactions between the infected device and the destination device can be examined to determine how the malicious agent was able to achieve egress from the infected device to the destination device. For example, ports on the infected device and the destination device used by the malicious agent to achieve egress as well as other details of the egress of the malicious agent from the infected device to the destination device can be examined.

At block 808, the ingress and egress patterns of the malicious agent to and from the infected device are examined to discover propagation characteristics of the malicious agent. For example, the manner in which the malicious agent spreads can be extrapolated from the history of propagation of the malicious agent across one or more infected devices. This information can be used to estimate where the malicious agent will spread in the future, and what weaknesses exist in the devices, and or in a network or environment in which the devices are found, which might be allowing the malicious agent to spread.

At block 810, the propagation characteristics of the malicious agent are used to ameliorate propagation of the malicious agent. For example, by knowing where the malicious agent may spread to next, and by knowing how the malicious agent may spread, measures can be taken automatically, or by an entity such as an administrator, to block possible paths of communication that the malicious agent can be expected to use to further propagate.

In addition, the malicious agent can be removed from all devices which it currently infects. Further, by examining scan result of the infected devices, settings changed by the malicious agent on the various infected devices can be reset to the settings existing before the infection.

CONCLUSION

Although embodiments of client health validation using historical data have been described in language specific to structural features and/or methods, it is to be understood that the subject of the appended claims is not necessarily limited to the specific features or methods described. Rather, the specific features and methods are disclosed as exemplary implementations of client health validation using historical data.

What is claimed is:

1. A method comprising:

using a vulnerability assessment agent comprising a processing device, detecting a client device attempting to regain access to an organization's network, wherein the vulnerability assessment agent resides on an enterprise network;

scanning historical data associated with the client device attempting to regain access to the organization's network for indicators that the client device has interacted with one or more sources from networks other than the organization's network;

reviewing the historical data for indicators associated with suspicious activity between the client device and the one or more sources from other networks, wherein the scanning is performed by the processing device on the enterprise network as the client device is attempting to regain access to the organization's network;

using a scanning result to investigate for an ingress pattern of a malicious agent interacting between the client device and the one or more sources from other networks;

using the scanning result to investigate for an egress of the malicious agent from the client device to other devices;

utilizing the ingress and egress patterns of the malicious agent to discover propagation characteristics of the malicious agent;

using propagation characteristics of the malicious agent to ameliorate the propagation of the malicious agent by blocking possible oaths of communication that the malicious agent can be expected to use to further propagate;

evaluating the client device to determine whether the client device has acceptable health, the client device being determined to have acceptable health if evidence in the historical data indicates interactions between the client device and the one or more sources from networks other than the organization's network is below a threshold at which future health of the client device and the organization's network could be at risk, wherein the threshold is established in a risk policy that is set automatically by the vulnerability assessment agent;

instigating remedial action if the historical data includes indicators associated with suspicious activity and the threshold for interactivity has been exceeded; and allowing the client device to access the organization's network if the historical data does not include indicators associated with suspicious activity, or if the client device is determined to have acceptable health.

2. The method of claim 1, wherein scanning includes one or more of:

scanning application data caches on the client device;

scanning logs on the client device;

scanning cookies on the client device.

3. The method of claim 1, wherein reviewing includes scanning the historical data for indicators that the client device has interacted with one or more sources from the other networks included on a blacklist.

4. The method of claim 1, wherein reviewing includes scanning for inconsistencies between the historical data and data associated with activity of the client device stored on one or more edge servers used by the client device to interact with one or more sources from the other networks.

5. The method of claim 1, wherein instigating includes quarantining the client device from the organization's network.

6. The method of claim 1, wherein instigating includes marking the client device as suspicious.

7. The method of claim 1, wherein instigation instigating includes performing a deep scan on the client device.

8. The method of claim 1, wherein instigating includes processing the client device to remove any malicious agents and/or any effects of malicious agents on the client device.

9. A computer-readable storage medium having a set of computer-readable instructions residing thereon that, when executed by a computer, perform acts comprising:

using a vulnerability assessment agent comprising a processing device, detecting a client device attempting to regain access to an organization's network, wherein the vulnerability assessment agent resides on the organization's network;

scanning historical data on a client device, wherein the scanning is performed by a processing device, as the client device is attempting to regain access to the organization's network for indicators that the client device has interacted with one or more sources from networks other than the organization's network;

reviewing the historical data for indicators associated with suspicious activity between the client device and the one or more sources from other networks;

using a scanning result to investigate an ingress pattern of a malicious agent interacting between the client device and the one or more sources from other networks;

using a separate scanning result to investigate an egress of the malicious agent from the client device to other devices;

evaluating the client device to determine whether the client device has acceptable health, the client device being determined to have acceptable health if evidence in the historical data indicates interactions between the client device and the one or more sources from networks other than the organization's network is below a threshold at which future health of the client device and the organization's network could be at risk, the threshold being established in a risk policy that is set automatically by the vulnerability assessment agent;

instigating remedial action if the historical data includes indicators associated with suspicious activity and the threshold for interactivity has been exceeded;

issuing a health certificate to the client if the health of the client is acceptable; and allowing the client device to access the organization's network if the historical data does not include indicators associated with suspicious activity, and if the client device is determined to have acceptable health.

10. The computer-readable storage medium of claim 9 having a set of computer-readable instructions that, when executed by the computer, perform acts further comprising scanning historical data in application data caches on the client device.

11. The computer-readable storage medium of claim 9 having a set of computer-readable instructions that, when executed by the computer, perform acts further comprising marking the client device as having unacceptable health if the historical data indicates one or more interactions conflicting with a preset policy.

12. The computer-readable storage medium of claim 11 having a set of computer-readable instructions that, when executed by the computer, perform acts further comprising alerting a network administrator that the client device has unacceptable health, and presenting the network administrator with an option to deny the client device access to the organization's network.

13. The computer-readable storage medium of claim 11 having a set of computer-readable instructions that, when executed by the computer, perform acts further comprising marking the client device as having unacceptable health if the historical data indicates one or more interactions with a blacklisted source.

14. An apparatus comprising:

one or more processing devices;

a vulnerability assessment agent operable by the one or more processing devices configured to:

scan historical data on a client device that is attempting to regain access to a corporate network for indicators that the client device has interacted with one or more sources from networks other than the corporate network;

review the historical data for indicators associated with suspicious activity between the client device and the one or more sources from other networks;

use a scanning result to investigate an ingress for a malicious agent interacting between the client device and the one or more sources from other networks;

use the scanning result to investigate an egress of the malicious agent from the client device to other devices;

utilize the ingress and egress of the malicious agent to discover propagation characteristics of the malicious agent;

use propagation characteristics of the malicious agent to ameliorate the propagation of the malicious agent by blocking possible paths of communication that the malicious agent can be expected to use to further propagate;

evaluate the client device to determine whether the client device has acceptable health, the client device being determined to have acceptable health if evidence in the historical data indicates interactions between the client device and the one or more sources from networks other than the organization's network is below a threshold at which future health of the client device and the organization's network could be at risk, the threshold being established in a risk policy that is set automatically by the vulnerability assessment agent;

instigate remedial action if the historical data includes indicators associated with suspicious activity and the threshold for interactivity has been exceeded; and generate assessment of acceptable health of the client if no indicators associated with suspicious activity are found in the historical data, the assessment of acceptable health can be utilized by a system health validation agent to grant a health certificate to the client device, the health certificate being configured to allow the client device to access the corporate network.

15. The apparatus of claim 14, wherein the vulnerability assessment agent resides on the client device.

16. The apparatus of claim 14, wherein the vulnerability assessment agent is further configured to recognize indicators associated with suspicious activity based on definitions of indicators associated with suspicious activity found in a preset policy.

17. The apparatus of claim 14, wherein indicators associated with suspicious activity include at least one of:

data indicating contact with a blacklisted source;

data indicating contact with one or more suspicious sources;

data indicating disagreement between the historical data on the client device and data on one or more edge servers.

18. The apparatus of claim 14, wherein the vulnerability assessment agent is further configured to generate an assessment of unacceptable health of the client device if indicators associated with suspicious activity are found in the historical data.

19. The apparatus of claim 18, wherein the vulnerability assessment agent is further configured to mark the client device as quarantineable if the client device has a high probability of being infected with malicious agents.

20. The apparatus of claim 18, wherein the vulnerability assessment agent is further configured to perform a deep scan on the client device.

* * * * *